United States Patent [19]
Kaneko

[11] Patent Number: 5,369,068
[45] Date of Patent: Nov. 29, 1994

[54] BISMUTH LAMELLAR COMPOUND

[75] Inventor: Kazuhide Kaneko, Susono, Japan

[73] Assignee: Toyota Jidosha Kabushiki Kaisha, Aichi, Japan

[21] Appl. No.: 98,103

[22] Filed: Jul. 28, 1993

[30] Foreign Application Priority Data

| Jul. 31, 1992 | [JP] | Japan | 4-204791 |
| Jul. 31, 1992 | [JP] | Japan | 4-204792 |
| Jul. 31, 1992 | [JP] | Japan | 4-204802 |
| Jul. 31, 1992 | [JP] | Japan | 4-204833 |

[51] Int. Cl.$^5$ .................................. C04B 35/46
[52] U.S. Cl. .................... 501/135; 501/136;
501/137; 501/139; 501/134; 423/593; 423/598;
252/62.9
[58] Field of Search ............... 501/135, 136, 137, 139,
501/134; 423/598, 593; 252/62.9 R

[56] References Cited

U.S. PATENT DOCUMENTS 4,761,242  8/1988  Suzuki et al. .................. 501/135

FOREIGN PATENT DOCUMENTS 55-16379  5/1980  Japan .
55-16380  5/1980  Japan .

OTHER PUBLICATIONS

Takenaka et al, Pyroelectric Properties of Bismuth layer-structured ferroelectric ceramics, Ferroelectrics, 118(1-4), 123-33, 1991 no month.
Takenaka et al, Piezoelectric Properties of Grain-oriented Bismuth layer-structured Ferroelectric Ceramics, Proc. IEEE Int. Symp. 6th, pp. 414–417, 1986 no month.

*Primary Examiner*—Karl Group
*Assistant Examiner*—C. Bonner
*Attorney, Agent, or Firm*—Finnegan, Henderson, Farabow, Garrett & Dunner

[57] ABSTRACT

Disclosed is a bismuth layer compound expressed by a chemical formula, $(M1_{1-2x}M2_xBi_{4+x})Ti_4O_{15}$, wherein "M1" is alkaline earth metal including Sr at least, "M2" is alkali metal, and "x" falls in a range, $0.06 \leq x \leq 0.44$. "M1" can be replaced by Pb or combinations of Pb and alkaline earth metal. The bismuth layer compound exhibits a less fluctuating sensitivity with respect to temperature variations. The bismuth layer compound can further include Mn in a form of MnO in an amount of from 0.02 to 0.25% by weight, and thereby it exhibits not only an upgraded sensitivity but also it does not exhibits a hysteresis in a force-electric charge output diagram.

13 Claims, 6 Drawing Sheets

BISMUTH LAMELLAR COMPOUND

BACKGROUND OF THE INVENTION

1. Field of the Invention

The present invention relates to a bismuth layer compound which exhibits a piezoelectric property and which is applicable to pressure sensors, high-frequency filters, or the like. Description of the Related Art The following have been known as ceramics which exhibit piezoelectric properties: barium titanate ($BaTiO_3$), lead titanate ($PbTiO_3$), lead zirconate titanate solid solution (hereinafter simply referred to as "PZT"), bismuth layer compound ($SrBi_4Ti_4O_{15}$), and the like.

For example, since the PZT exhibits an exceptionally high sensitivity, it has been used as piezoelectric actuators.

The bismuth layer compound does not exhibit a sensitivity so high as that of the PZT. However, it exhibits a great strength and a high Curie temperature falling in a range of from 500° to 800° C. approximately. Accordingly, it can be used in a wider temperature range, and it is expected to be applied to pressure sensors.

Japanese Examined Patent Publication (KOKOKU) No. 55-16,380 discloses a piezoelectric porcelain composition which includes a bismuth layer compound containing manganese. The composition exhibits a high resistivity and a low permitivity. Further, it exhibits a large electromechanical coupling coefficient ($k_t$) and a large mechanical quality coefficient ($Q_m$). Furthermore, it exhibits a small capacitance temperature dependency coefficient ($C_xTC$) and a small resonant frequency temperature dependency coefficient ($f_rTC$). All in all, it is appropriate for making high-frequency filters.

However, the conventional bismuth layer compound has been found to exhibit considerably fluctuating sensitivities in the piezoelectric property in a temperature range of from 30° to 150° C. Even when manganese is added to the conventional bismuth layer compound in accordance with the aforementioned publication, the resulting bismuth layer compound has been also found to keep exhibiting the fluctuation in the sensitivity. As illustrated in FIG. 1, the sensitivity in the piezoelectric property herein means an electric charge per a unit force, i.e., E/F (in a unit of pC/N), when a force "F" is applied to a test specimen to generate an electric charge in an amount of "E."

Hence, in order to use the conventional bismuth layer compound as pressure sensors which should operate in a wide temperature range, it is indispensable to employ a temperature compensation circuit. Further, in order to use such pressure sensors at places where temperatures vary violently, there arises the problem in that the temperature compensation circuit tends to be complicated considerably. Thus, the bismuth layer compound has been inhibited from being applied to pressure sensors.

SUMMARY OF THE INVENTION

The present invention has been developed in view of the circumstances of the conventional bismuth layer compounds. It is therefore an object of the present invention to reduce the sensitivity fluctuations exhibited by the conventional bismuth layer compounds with respect to the temperature variations, thereby providing a bismuth layer compound which can exhibit a less fluctuating sensitivity with respect to the temperature variations.

The present inventor studied the compositions of the conventional bismuth layer compounds extensively in order to solve the problems associated therewith. As a result, he discovered that the sensitivity comes to be fluctuated less with respect to the temperature variations by coexisting alkaline earth metal including Sr and alkali metal in predetermined ratios. He thus completed the present invention successfully, thereby producing a first bismuth layer compound according to the present invention.

The first present bismuth layer compound can carry out the aforementioned object, and it is expressed by a chemical formula:

$(M1_{1-2x}M2_xBi_{4+x})Ti_4O_{15}$, wherein

"M1" is alkaline earth metal including Sr at least;
"M2" is alkali metal; and
"x" falls in a range, $0.06 \leq x \leq 0.44$.

In the chemical formula, "Mi" is alkaline earth metal including Sr at least. It can be comprised of Sr alone, or it can be comprised of Sr, and at least one alkaline earth metal selected from the group consisting of Be, Mg, Ca, Ba and Ra and coexisting with Further, "M2" is alkali metal, and it can be at least one alkaline metal selected from the group consisting of Li, Na, K, Rb, Cs and Fr.

Furthermore, "x" expresses a content of "M2," and it is required to fall in a range, $0.06 \leq x \leq 0.44$, preferably $0.10 \leq x \leq 0.40$. When the value "x" does not fall in the range, the resulting bismuth layer compound unpreferably exhibits a fluctuation, which enlarges to the magnitudes of the fluctuations exhibited by the conventional bismuth layer compounds free from the alkali metal, in the sensitivity with respect to the temperature variations.

However, the first present bismuth layer compound was found to exhibit a low sensitivity in the piezoelectric property, for instance, 8 pC/N at 30° C. Accordingly, the present inventor intended to further upgrade the sensitivity of the first present bismuth layer compound.

In due course, the present inventor came to think of adding another component to the first present bismuth layer compound, and he examined diligently for the other component. As a result, he found out that the first present bismuth layer compound is enhanced in the sensitivity by adding Mn in a predetermined amount, and that it comes to exhibit a hysteresis of smaller magnitude in the force-electric charge output diagram, thereby producing a second bismuth layer compound according to the present invention.

In addition to the components of the first present bismuth layer compound, the second present bismuth layer compound includes Mn in a form of MnO in an amount of from 0.02 to 0.25% by weight, preferably from 0.05 to 0.10% by weight.

When Mn is included in an amount of less than 0.02% by weight, the resulting bismuth layer compound comes to exhibit a lower sensitivity in the piezoelectric property. When Mn is included in an amount of more than 0.25% by weight, the resulting bismuth layer compound comes to exhibit a hysteresis of larger magnitude in the force-electric charge output diagram.

Moreover, in order to further enhance the heat resistance, the first and second present bismuth layer compounds can further include the other metallic component such as Ni, Cr, or the like, coexisting with the above-described components in an amount of from 0.05 to 0.10% by weight so as not to adversely affect their superb performance.

Thus, the first and second present bismuth layer compounds include alkaline earth metal including Sr and alkaline metal in the predetermined ratios. Accordingly, they come to exhibit less fluctuating sensitivities with respect to the temperature variations, though the reasons for the advantageous effect is still under investigation.

In addition, the second present bismuth layer compound includes Mn in the predetermined amount. Consequently, it comes to be able to exhibit an upgraded sensitivity, and it hardly exhibits a hysteresis in the force-electric charge output diagram.

The present inventor studied the compositions of the conventional bismuth layer compounds extensively in order to more effectively solve the problems associated therewith. As a result, he also discovered that the sensitivity comes to be fluctuated much less with respect to the temperature variations by coexisting Pb and alkaline metal in predetermined ratios, and he further discovered that the similar advantageous effect can be produced by replacing a part of Pb with alkali earth metal. He thus produced a third bismuth layer compound according to the present invention successfully.

The third present bismuth layer compound can also carry out the aforementioned object, and it is expressed by a chemical formula:

$\{(M3_{1-y}Pb_y)_{1-2x}M2_xBi_{4+x})\}Ti_4O_{15}$, wherein

"M3" is alkaline earth metal;

"M2" is alkali metal;

"x" falls in a range, $0.06 \leq x \leq 0.44$; and

"y" falls in a range, $0 < y \leq 1.0$.

In the chemical formula, "M3" is at least one alkaline earth metal selected from the group consisting of Be, Mg, Ca, Sr, Ba and Ra.

Further, "M2" is alkaline metal, and it can "be at least one alkaline metal selected from the group consisting of Li, Na, K, Rb, Cs and Fr.

Furthermore, "x" expresses a content of "M2," and it is required to fall in a range, $0.06 \leq x \leq 0.44$, preferably $0.10 \leq x \leq 0.40$. When the value "x" does not fall in the range, the resulting bismuth layer compound unpreferably exhibits a fluctuation, which enlarges to the magnitudes of the fluctuations exhibited by the conventional bismuth layer compounds free from the alkaline metal, in the sensitivity with respect to the temperature variations.

Moreover, contents of Pb and "M3" depend on the value "y." The value "y" is required to fall in a range, $0 < y < 1$, in order that the third present bismuth layer compound includes Pb as well as "M3," the alkaline earth metal.

However, the third present bismuth layer compound was also found to exhibit a low sensitivity in the piezoelectric property, for instance, 8 pC/N at 30° C. Accordingly, the present inventor intended to further upgrade the sensitivity of the third present bismuth layer compound.

In due course, the present inventor came to think of adding another component to the third present bismuth layer compound, and he examined diligently for the other component. As a result, he found out that the third present bismuth layer compound is enhanced in the sensitivity by adding Mn in a predetermined amount, and that it comes to exhibit a hysteresis of smaller magnitude in the force-electric charge output diagram, thereby producing a fourth bismuth layer compound according to the present invention.

In addition to the components of the third present bismuth layer compound, the fourth present bismuth layer compound includes Mn in a form of MnO in an amount of from 0.05 to 0.25% by weight, preferably from 0.05 to 0.10% by weight.

When Mn is included in an amount of less than 0.05% by weight, the resulting bismuth layer compound comes to exhibit a lower sensitivity in the piezoelectric property. When Mn is included in an amount of more than 0.25% by weight, the resulting bismuth layer compound comes to exhibit a hysteresis of larger magnitude in the force-electric charge output diagram.

Moreover, in order to further enhance the heat resistance, the third and fourth present bismuth layer compounds can further include the other metallic component such as Ni, Cr, or the like, coexisting with the above-described components in an amount of from 0.05 to 0.10% by weight so as not to adversely affect their superb performance.

Thus, the third and fourth present bismuth layer compounds include Pb independently, or alkaline earth metal including Pb, and alkali metal in the predetermined ratios. Accordingly, they come to exhibit less fluctuating sensitivities with respect to the temperature variations, though the reasons for the advantageous effect is still under investigation.

Further, the third and fourth present bismuth layer compounds include Pb as one of the requisite components. Consequently, it is possible to control the temperature dependency of their sensitivities in the piezoelectric property, though the reasons for this extra advantageous effect are still under investigation as well. For instance, as illustrated in FIGS. 5 and 8, they exhibit relative sensitivities which vary negatively with respect to the temperature variations when the alkali metal content is small, e.g., x=0.1. On the other hand, they exhibit relative sensitivities which vary positively with respect to the temperature variations as the alkali metal contents increase, for example, when the value "x" equals 0.4. Therefore, it is possible to readily control the temperature dependency of their relative sensitivities by adjusting the contents of the alkaline metal and eventually those of Pb and "M3," alkaline earth metal.

Furthermore, when the third and fourth present bismuth layer compounds are free from alkaline earth metal and include Pb independently, e.g., y=1, they exhibit relative sensitivities which vary negatively with respect to the temperature variations, and they exhibit relative sensitivities which vary positively with respect to the temperature variations as the alkali earth metal contents increase in a range, $0 < y < 1$. Therefore, it is also possible to control the temperature dependency of their relative sensitivities by adjusting the values of "y," i.e., the contents of Pb.

In addition, the fourth present bismuth layer compound includes Mn in the predetermined amount. Consequently, it comes to be able to exhibit an upgraded sensitivity, and it hardly exhibits a hysteresis in the force-electric charge output diagram.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which form a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiments (1) Production of Bismuth Layer Compound

The following starting raw material powders were prepared: Strontium carbonate ($SrCO_3$), sodium carbonate ($Na_2CO_3$), bismuth oxide ($Bi_2O_3$) and titanium oxide ($TiO_2$). The raw material powders were weighed respectively so that the molar ratios of St, Na, Bi, Ti and O satisfied a chemical formula, $(Sr_{0.8}Na_{0.1}Bi_{4.1})Ti_4O_{15}$, and they were wet-mixed in a pot mill together with ethanol for 48 hours.

The resulting mixed powder was dried to remove ethanol, and it was calcined at a temperature of from 700° to 950° C. for 2 hours. The thus calcined powder was again wet-mixed in a pot mill together with ethanol for 48 hours, and it was dried to remove ethanol. A particulate raw material was thus prepared.

About 3% by weight of polyvinyl alcohol (PVA) was added to the particulate raw material to granulate. The granulated raw material was charged into a mold, and it was press-molded by applying a molding pressure of 1 ton/cm² thereby preparing pellet-shaped molded bodies having a diameter of 20 mm and a thickness of 1 mm.

The molded bodies were placed on a pad member made from a zirconia powder, and they were accommodated in a crucible. The crucible was covered with a lid made from alumina to carry out baking. The baking conditions were as follows: The crucible was heated at a temperature increment speed of 20C ° C./hour in air, and the molded bodies were baked at a temperature of from 1,100° to 1,300° C. for 2 hours. With the baking, pellet-shaped elements including the First Preferred Embodiments of the present bismuth layer compound were obtained. The present bismuth layer compound had a composition which was expressed by the chemical formula, $(Sr_{0.8}Na_{0.1}Bi_{4.1})Ti_4O_{15}$ (i.e., x=1 in the aforementioned general chemical formula).

(2) Production of Piezoelectric Element

The resulting elements were coated with a silver paste on both of the end surfaces by screen printing, and they were baked to form silver electrodes thereon. Then, the elements were immersed into a silicone oil, and they were subjected to a voltage application of from 6 to 10 kV at 200° C. for 10 minutes to carry out polarization treatment. Piezoelectric elements were thus produced.

(3) Examination for Sensitivity

Figure 1:
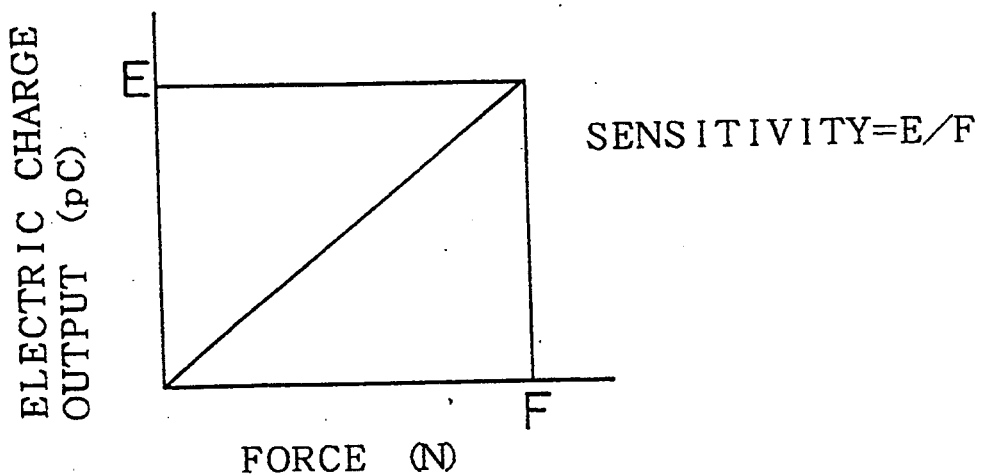
FIG. 1 illustrates a relationship between forces and electric charge outputs, and it is an explanatory diagram for showing the definition on the sensitivity in the piezoelectric property.

The piezoelectric elements were examined for their sensitivities in the piezoelectric property in accordance with FIG. 1 while varying the temperature variously in a range of from 30° to 150° C. The relative values of the sensitivities at the temperatures were calculated with respect to the sensitivity at 30° C., e.g., 8 pC/N, taken as 1. The results of the evaluation are outlined diagrammatically in FIG. 2.

Figure 2:
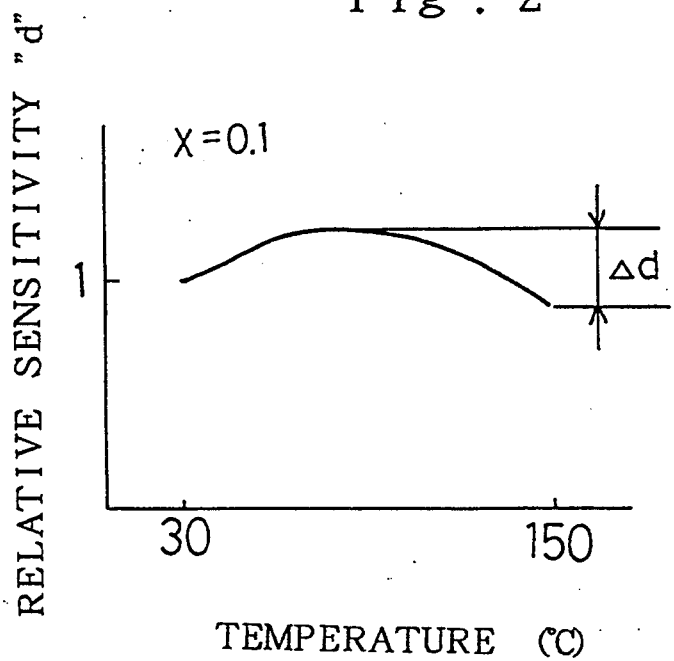
FIG. 2 illustrates a relationship between temperatures of First and Second Preferred Embodiments of the present bismuth layer compound and relative sensitivity exhibited thereby, and it is an explanatory diagram for showing how to calculate the relative sensitivity variation rates with respect to temperature variations.

As illustrated in FIG. 2, the relative sensitivities were plotted to draw a curve which had a maximum value and was convexed upward. Accordingly, an index was devised in order to express the fluctuations of the relative sensitivities with respect to the temperature variations. Namely, the maximum and minimum values of the relative sensitivities "d" were calculated in the temperature range, and the difference "d" therebetween was defined as the temperature variation rate of the sensitivity. The result of the temperature variation rate calculation is set forth in Table 1 below.

(4) Examination for Dependency of Temperature Variation Rates of Sensitivity on Na Contents In addition, the above-mentioned four raw material powders were weighed respectively so that the molar ratios of St, Na, Bi, Ti and O satisfied the general chemical formula, $(Sr_{1-2x}Na_xBi_{4+x})Ti_4O_{15}$, and that the value "x's," i.e., the molar ratios of Na, were 0, 0.05, 0.2, 0.3, 0.4, 0.45 and 0.5, respectively. The resulting 7 mixed powders were processed into 7 piezoelectric elements in the same manner as the above-described bismuth layer compound expressed by the chemical formula, $(Sr_{0.8}Na_{0.1}Bi_{4.1})Ti_4O_{15}$, was processed.

Likewise, the resulting 7 piezoelectric elements were examined for their temperature variation rates of the sensitivities in the same manner as the piezoelectric elements described above were examined. The results of the temperature variation rate calculations are also set forth in Table 1 below.

TABLE 1

| "x," Molar Ratio of Na | 0 | 0.05 | 0.1 | 0.2 | 0.3 | 0.4 | 0.45 | 0.5 |
|---|---|---|---|---|---|---|---|---|
| Temperature Variation Rate of Sensitivity (%) | 8 | 8 | 4 | 3 | 5 | 4 | 9 | 10 |

Evaluation No. 1

It is apparent from Table 1 that the piezoelectric elements were adapted to exhibit the temperature variation rate of the sensitivity of 5% or less when the value "x" fell in a range, $0.05 < x < 0.45$, and that the piezoelectric elements made from the bismuth layer compounds having the value "x" falling in the range exhibited remarkably reduced temperature variation rates when compared to the piezoelectric elements made from the conventional bismuth layer compound whose value "x" was zero. Hence, it was thus verified that the First Preferred Embodiments of the present bismuth layer compound can make a piezoelectric element whose sensitivity is less likely to fluctuate with respect to the temperature variations, and that they are useful to make a pressure sensor.

(5) Examination for Dependency of Temperature Variation Rates of Sensitivity on Other Components In addition, other bismuth layer compounds were prepared which had compositions falling in the range recited in the accompanying claim but the other alkaline earth metals, e.g., Be, Mg, Ca, Ba and Ra, substituted for a part of St. Piezoelectric elements were produced with the other bismuth layer compounds and tested in the same manner. By thusly including Sr at least, these piezoelectric elements were adapted to produce the same advantageous effects described above.

As having been described so far, the First Preferred Embodiments of the present bismuth layer compound exhibited the sensitivities which depended less on the temperature variations. Therefore, they can obviate the temperature compensation circuit even when they are applied to places where the temperatures vary violently, and accordingly they can be adapted to make a pressure sensor which should operate in a wider temperature range. Thus, they can be employed to reduce the overall manufacturing cost. Further, they exhibited low relative dielectric constants of from 130 to 160. Hence, they are suitable to make a high-frequency filter, or the like.

Second Preferred Embodiments (1) Production of Bismuth Layer Compounds

The Second Preferred Embodiments of the present bismuth layer compound were prepared as described in the First Preferred Embodiments except that magnesium oxide (MnO) was prepared as an extra starting raw material powder in addition to the four starting raw material powders, and that MnO was weighed so as to be contained in the resulting mixed powder in an amount of 0.02% by weight.

The mixed powder according to the Second Preferred Embodiments was processed into the pellet-shaped elements in the same manner as those of the First Preferred Embodiments. The pellet-shaped elements included the Second Preferred Embodiments of the present bismuth layer compound which had a composition expressed by the chemical formula, $Sr_{0.8}Na_{0.1}Bi_{4.1})Ti_4O_{15}$ (i.e., $x=1$ in the aforementioned general chemical formula) and which included Mn in a form of MnO in an amount of 0.02% by weight.

(2) Production of Piezoelectric Element

The resulting elements were processed into the piezoelectric elements as described in the First Preferred Embodiments.

(3) Examination for Sensitivity

The piezoelectric elements according to the Second Preferred Embodiments were examined for their sensitivities in the piezoelectric property in the same manner as those of the First Preferred Embodiments. It was found that the results of the evaluation were equivalent to FIG. 2.

Likewise, the relative sensitivities were plotted, and the temperature variation rates of the sensitivities were calculated as described in the First Preferred Embodiments. The result of the temperature variation rate calculation is set forth in Table 2 below.

(4) Examination for Dependency of Temperature Variation Rates of Sensitivity on Na Contents In addition, the above-mentioned five raw material powders were weighed respectively so that the molar ratios of St, Na, Bi, Ti and O satisfied the general chemical formula, $(Sr_{1-2x}Na_xBi_{4+x})Ti_4O_{15}+zMnO$, and that the value "x's," i.e., the molar ratios of Na, were 0, 0.05, 0.2, 0.3, 0.4, 0.45 and 0.5, respectively, and that the value "z," i.e., the content of MnO, was fixed at the predetermined value of 0.02% by weight. The resulting 7 mixed powders were processed into 7 piezoelectric elements in the same manner as the above-described bismuth layer compound expressed by the chemical formula, $(Sr_{0.8}Na_{0.1}Bi_{4.1})Ti_4O_{15}+0.02$ MnO, was processed.

Likewise, the resulting 7 piezoelectric elements were examined for their temperature variation rates of the sensitivities in the same manner as those made from the bismuth layer compound were examined. The results of the temperature variation rate calculations are also set forth in Table 2 below.

TABLE 2

| "x," Molar Ratio of Na | 0 | 0.05 | 0.1 | 0.2 | 0.3 | 0.4 | 0.45 | 0.5 |
|---|---|---|---|---|---|---|---|---|
| Temperature Variation Rate of Sensitivity (%) | 8 | 8 | 4 | 3 | 5 | 4 | 9 | 10 |

Evaluation No. 2

It is apparent from Table 2 that the piezoelectric elements were adapted to exhibit the temperature variation rate of the sensitivity of 5% or less when the value "x" fell in a range, $0.05 < x < 0.45$, and that the piezoelectric elements made from the bismuth layer compounds having the value "x" falling in the range exhibited remarkably reduced temperature variation rates when compared to the piezoelectric elements made from the conventional bismuth layer compound whose value "x" was zero. Hence, it was thus verified that the Second Preferred Embodiments of the present bismuth layer compound can make a piezoelectric element whose sensitivity is less likely to fluctuate with respect to the temperature variations, and that they are useful to make a pressure sensor.

(5) Examination for Dependency of Temperature Variation Rates of Sensitivity on Mn Contents Further, matrices were designed so as to satisfy the general chemical formula, $(Sr_{1-2x}Na_xBi_{4+x})Ti_4O_{15}+zMnO$, in which the value "z's" were varied in a range of from 0 to 0.30% by weight and the value "x" was fixed at 0.1. Then, the above-mentioned five raw material powders were weighed respectively so as to satisfy the composition of the matrices, and the resulting mixed powders were processed into a plurality of piezoelectric elements in the same manner as the above-described bismuth layer compound expressed by the chemical formula, $(Sr_{0.8}Na_{0.1}Bi_{4.1})Ti_4O_{15}+0.02MnO$.

Figure 3:
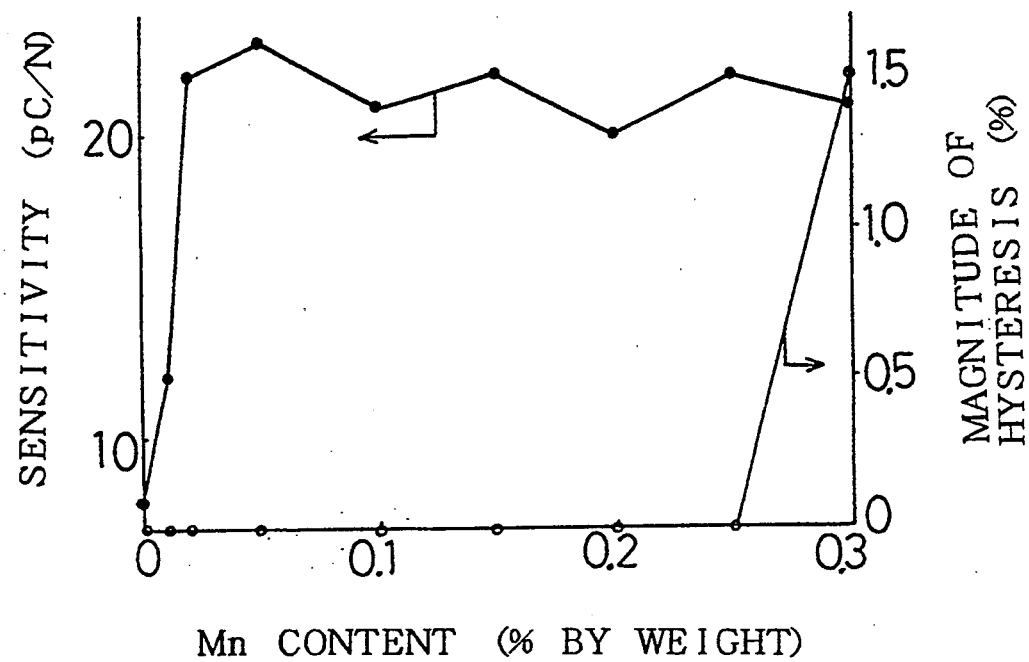
FIG. 3 is a diagram for illustrating a relationship between Mn content variations, sensitivities and magnitudes of hysteresis exhibited by the Second Preferred Embodiments of the present bismuth layer compound.
Figure 4:
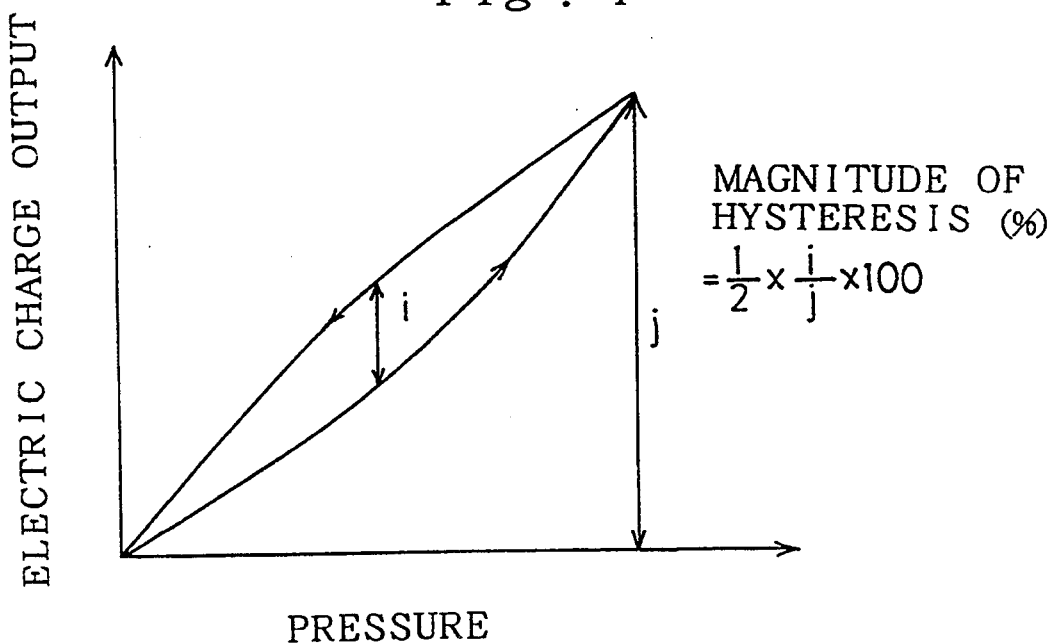
FIG. 4 is a diagram for illustrating the definition on the magnitude of hysteresis.

Each of the piezoelectric elements was examined for the sensitivity (in pC/N) at 30° C. and the magnitude of the hysteresis at 150° C. The results of the examinations are illustrated in FIG. 3. Here, the magnitude of the hysteresis was calculated as follows. Namely, as illustrated in FIG. 4, a width "i," i.e., the maximum width of the hysteresis loop of the electric charge output, and the maximum value "j" of the electric charge output were derived from the pressure-electric charge output diagram, and the magnitude of the hysteresis was calculated with the following equation:

"Magnitude of Hysteresis" $(\%) = (\frac{1}{2}) \times (i/j) \times 100$.

As can be appreciated from FIG. 3, the piezoelectric elements exhibited sharply deteriorating sensitivities when they included Mn in an amount of less than 0.02% by weight. On the other hand, they exhibited abruptly increasing magnitudes of the hysteresis when they included Mn in an amount of more than 0.25% by weight. Accordingly, it is understood that the piezoelectric elements can be adapted to simultaneously exhibit a high sensitivity and a hysteresis of low magnitude by controlling the Mn content in the range recited in the accompanying claim.

Furthermore, matrices were designed in the same manner except that the value "z" was fixed at 0.02% by weight and the value "x's" were varied in a range of from 0.1 to 0.4. Then, a plurality of piezoelectric elements satisfying the composition of the matrices were produced and examined for the sensitivity and the magnitude of the hysteresis as described above. Regardless of the variation in the value "x's," the piezoelectric elements exhibited behaviors in the sensitivity and the magnitude of the hysteresis similar to those illustrated in FIG. 3. Hence, it was found that the advantageous effects resulting from Mn are independent of those resulting from Na and Sr.

(6) Examination for Dependency of Temperature Variation Rates of Sensitivity on Other Components In addition, another bismuth layer compounds were prepared which had compositions falling in the range recited in the accompanying claim but the other alkaline earth metals, e.g., Be, Mg, Ca, Ba and Ra, substituted for a part of Sr. Piezoelectric elements were produced with the other bismuth layer compounds and tested in the same manner. By thusly including Sr at least, these piezoelectric elements were adapted to produce the same advantageous effects described above.

As having been described so far, the Second Preferred Embodiments of the present bismuth layer compound exhibited the sensitivities which depended less on the temperature variations. Therefore, they can obviate the temperature compensation circuit even when they are applied to places where the temperatures vary violently, and accordingly they can be adapted to make a pressure sensor which should operate in a wider temperature range. Thus, they can be employed to reduce the overall manufacturing cost. Further, they exhibited low relative dielectric constants of from 130 to 160. Hence, they are suitable to make a high-frequency filter, or the like.

Moreover, the Second Preferred Embodiments of the present bismuth layer compound exhibited high sensitivities. Therefore, they can detect micro pressure variations precisely. In particular, they hardly exhibited hysteresis when they were subjected to forces falling in a wide range of from 0 to 2,000N. Hence, they can be used as a pressure sensor for the places where large pressure variations arise. All in all, they can be employed to make a pressure sensor which can detect from the micro pressure variations to the large pressure variations accurately.

Third Preferred Embodiments (1) Production of Bismuth Layer Compound

The following starting raw material powders were prepared: Lead oxide (PbO), sodium carbonate ($Na_2CO_3$), bismuth oxide ($Bi_2O_3$) and titanium oxide ($TiO_2$). The raw material powders were weighed respectively so that the molar ratios of Pb, Na, Bi, Ti and O satisfied a chemical formula, $(Pb_{0.8}Na_{0.1}Bi_{4.1})Ti_4O_{15}$, and they were wet-mixed in a pot mill together with ethanol for 48 hours.

The resulting mixed powder was dried to remove ethanol, and it was calcined at a temperature of from 700° to 950° C. for 2 hours. The thus calcined powder was again wet-mixed together with ethanol in a pot mill for 48 hours, and it was dried to remove ethanol. A particulate raw material was thus prepared.

About 3% by weight of polyvinyl alcohol (PVA) was added to the particulate raw material to granulate. The granulated raw material was charged into a mold, and it was press-molded by applying a molding pressure of 1 ton/cm$^2$ thereby preparing pellet-shaped molded bodies having a diameter of 20 mm and a thickness of 1 mm.

The molded bodies were placed on a pad member made from a zirconia powder, and they were accommodated in a crucible. The crucible was covered with a lid made from alumina to carry out baking. The baking conditions were as follows: The crucible was heated at a temperature increment speed of 200° C./hour in air, and the molded bodies were baked at a temperature of from 1,100° to 1,300° C. for 2 hours. With the baking, pellet-shaped elements including the Third Preferred Embodiments of the present bismuth layer compound were obtained. The present bismuth layer compound had a composition which was expressed by the chemical formula, $(Pb_{0.8}Na_{0.1}Bi_{4.1})Ti_4O_{15}$, i.e., a homologue of $\{(M3_{1-y}Pb_y)_{1-2x}M2_xBi_{4+x}\}Ti_4O_{15}$ where "M2" is Na, the value "x" equals 0.1 and the value "y" equals 1.

(2) Production of Piezoelectric Element

The resulting elements were coated with a silver paste on both of the end surfaces by screen printing, and they were baked to form silver electrodes thereon. Then, the elements were immersed into a silicone oil, and they were subjected to a voltage application of from 6 to 10 kV at 200° C. for 10 minutes to carry out polarization treatment. Piezoelectric elements were thus produced.

(3) Examination for Sensitivity

The piezoelectric elements were examined for their sensitivities in the piezoelectric property in accordance with FIG. 1 while varying the temperature variously in a range of from 30° to 150° C. The relative values of the sensitivities at the temperatures were calculated with respect to the sensitivity at 30° C., e.g., 8 pC/N, taken as 1. The results of the evaluation are illustrated in FIG. 5.

Figure 5:
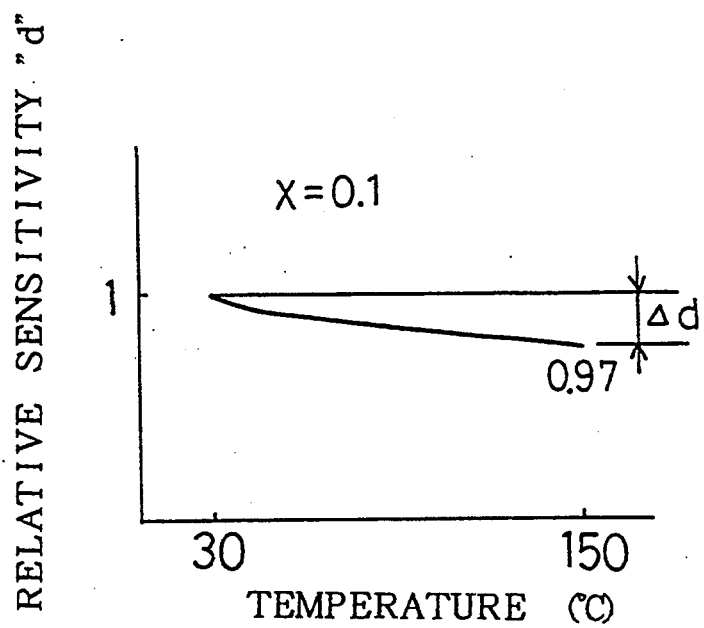
FIG. 5 is a diagram for illustrating a relationship between temperatures of Third and Fifth Preferred Embodiments of the present bismuth layer compound with the value "x" fixed at 0.1 (i.e., x=0.1) and relative sensitivities exhibited thereby.

As illustrated in FIG. 5, the relative sensitivities were plotted to draw a graph which decreased from the left-hand side to the right-hand side. Thus, the relative sensitivities showed a negative dependency on the temperature variations. Accordingly, an index was devised in order to express the fluctuations of the relative sensitivities with respect to the temperature variations. Namely, the maximum and minimum values of the relative sensitivities "d" were calculated in the temperature range in accordance with the graph, and the difference "d" therebetween was defined as the temperature variation rate of the sensitivity. The result of the temperature variation rate calculation is set forth in Table 3 below.

(4) Examination for Dependency of Temperature Variation Rates of Sensitivity Na Contents In addition, the above-mentioned four raw material powders were weighed respectively so that the molar ratios of Pb, Na, Bi, Ti and O satisfied the general chemical formula, $(Pb_{1-x2}Na_xBi_{4+x})Ti_4O_{15}$ "x's," i.e. the molar ratios of Na, were 0, 0.05, 0.2, 0.3, 0.4, 0.45 and 0.5, respectively. The resulting 7 mixed powders were processed into 7 piezoelectric elements in the same manner as the above-described bismuth layer compound expressed by the chemical formula, $(Pb_{0.8}Na_{0.1}Bi_{4.1})Ti_4O_{15}$, was processed.

Figure 6:
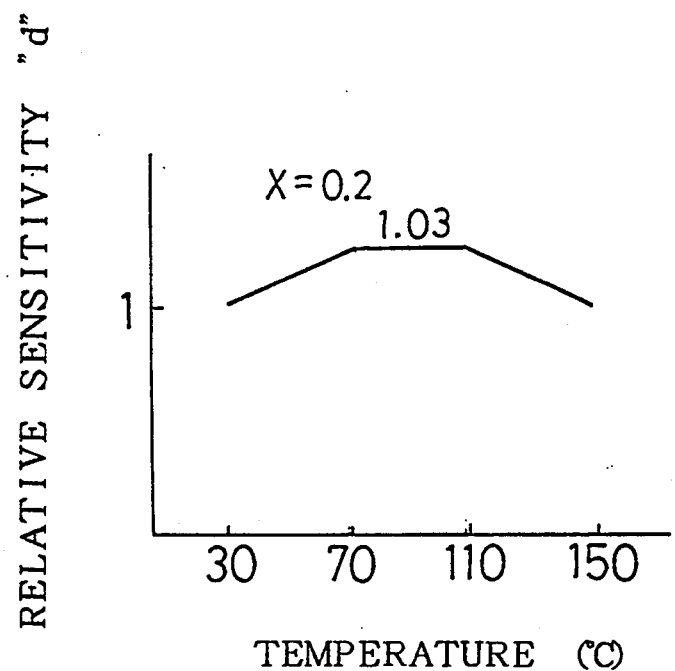
FIG. 6 is a diagram for illustrating a relationship between temperatures of the Third and Fifth Preferred Embodiments of the present bismuth layer compound with the value "x" fixed at 0.2 (i.e., x=0.2) and relative sensitivities exhibited thereby.
Figure 7:
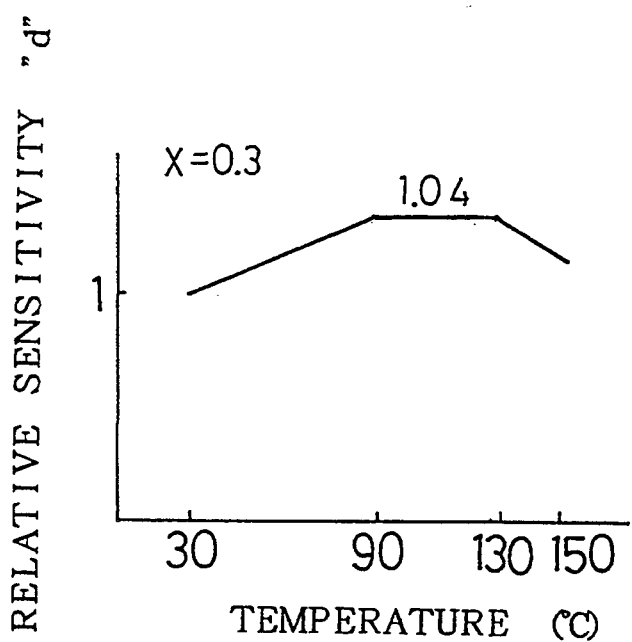
FIG. 7 is a diagram for illustrating a relationship between temperatures of the Third and Fifth Preferred Embodiments of the present bismuth layer compound with the value "x" fixed at 0.3 (i.e., x=0.3) and relative sensitivities exhibited thereby.
Figure 8:
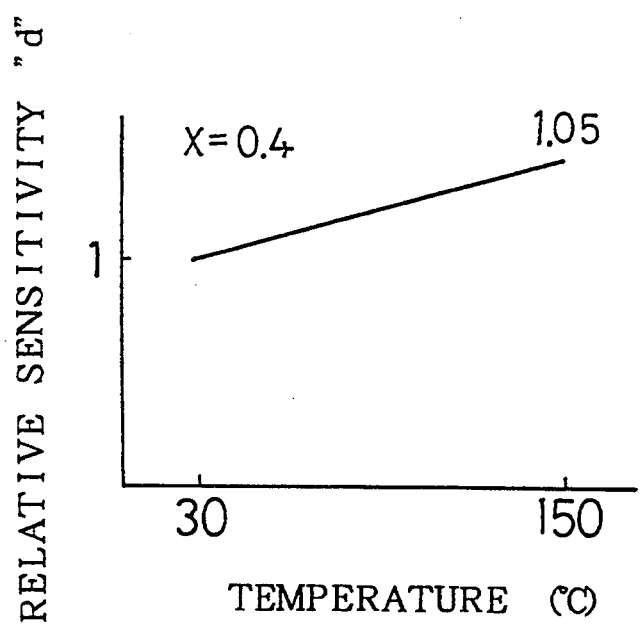
FIG. 8 is a diagram for illustrating a relationship between temperatures of the Third and Fifth Preferred Embodiments of the present bismuth layer compound with the value "x" fixed at 0.4 (i.e., x=0.4) and relative sensitivities exhibited thereby.

Likewise, the resulting 7 piezoelectric elements were examined for their sensitivities in the piezoelectric property in accordance with FIG. 1 while varying the temperature variously in a range of from 30° to 150° C. Among the 7 piezoelectric elements, the 3 piezoelectric elements whose value "x's" fell in a range, $0.2 \leq x \leq 0.4$, were examined for the relative values of the sensitivities at the temperatures. The relative values of the sensitivities were calculated with respect to the sensitivity at 30° C. taken as 1. The results of the evaluation are illustrated in FIGS. 6, 7 and 8, respectively.

Moreover, the other 4 piezoelectric elements whose value "x's" did not fall in the range, $0.2 \leq x \leq 0.4$, were also examined for the relative values of the sensitivities at the temperatures, and the relative values were plotted to draw graphs (not shown) similarly. In accordance with the graphs, the temperature variation rates exhibited by the other 4 piezoelectric elements were calculated. The results of the temperature variation rate calculations are also set forth in Table 3 below.

TABLE 3

| "x," Molar Ratio of Na | 0 | 0.05 | 0.1 | 0.2 | 0.3 | 0.4 | 0.45 | 0.5 |
|---|---|---|---|---|---|---|---|---|
| Temperature Variation Rate of Sensitivity (%) | 8 | 8 | 3 | 3 | 4 | 5 | 9 | 10 |

Evaluation No. 3

It is apparent from Table 3 that the piezoelectric elements were adapted to exhibit the temperature variation rate of the sensitivity of 5% or less when the value "x" fell in a range, $0.05 < x < 0.45$, and that the piezoelectric elements made from the bismuth layer compounds having the value "x" falling in the range exhibited remarkably reduced temperature variation rates when compared to the piezoelectric elements made from the conventional bismuth layer compound whose value "x" was zero. Hence, it was thus verified that the Third Preferred Embodiments of the present bismuth layer compound can make a piezoelectric element whose sensitivity is less likely to fluctuate with respect to the temperature variations, and that they are useful to make a By comparing FIGS. 5 and 8, the following can be understood: As illustrated in FIG. 5, the piezoelectric element which was made from one of the Third Preferred Embodiments of the present bismuth layer compound with the value "x" fixed at 0.1 (i.e., x=0.1) exhibited the relative sensitivities which depended on the temperature variations negatively. On the other hand, as illustrated in FIG. 8, the piezoelectric element which was made from one of the Third Preferred Embodiments of the present bismuth layer compound with the value "x" fixed at 0.4 (i.e., x=0.4) exhibited the relative sensitivities which depended on the temperature variations positively. Therefore, it is possible to readily control the dependency of the sensitivity on the temperature variations in the present bismuth layer compound by adjusting the value "x" of the aforementioned general chemical formula.

It is appreciated from FIGS. 6 and 7 that the Third Preferred Embodiments of the present bismuth layer compound with the value "x" fixed at 0.2 (i.e., x=0.2) and 0.3 (i.e., x=0.3) exhibited the relative sensitivities which scarcely fluctuated with respect to the temperature variations in certain temperature ranges, e.g., from 70° to 110° C. in FIG. 6 and from 90° to 130° C. in FIG. 7, and that the maximum relative sensitivities existed in the temperature ranges where the relative sensitivities were independent of the temperature variations. Hence, it is possible to use the Third Preferred Embodiments to make elements which exhibit high relative sensitivities in the temperature ranges.

Fourth Preferred Embodiments

The following starting raw material powders were prepared: Strontium carbonate (SrCO3), lead oxide (PbO), sodium carbonate (Na2CO3), bismuth oxide (Bi2O3) and titanium oxide (TiO2). The raw material powders were weighed respectively so that the molar ratios of Sr, Pb, Na, Bi, Ti and O satisfied the general chemical formula, $((Sr0.2\ Pb0.8)_{1-2x}Na_xBi_{4+x})Ti_4O_{15}$, and that the value "x's" were varied as described above, e.g., 0, 0.05, 0.1, 0.2, 0.3, 0.4, 0.45 and 0.5. Finally, they were wet-mixed in a pot mill together with water for 48 hours, respectively.

The resulting mixed powders were processed into piezoelectric elements in the same manner as described in the Third Preferred Embodiments, respectively. Likewise, the piezoelectric elements were examined for their relative sensitivities at the temperatures, thereby calculating the temperature variation rates of the sensitivities. The results of the temperature variation rate calculations are set forth in Table 4 below.

TABLE 4

| "x," Molar Ratio of Na | 0 | 0.05 | 0.1 | 0.2 | 0.3 | 0.4 | 0.45 | 0.5 |
|---|---|---|---|---|---|---|---|---|
| Temperature Variation Rate of Sensitivity (%) | 8 | 8 | 3 | 3 | 4 | 3 | 9 | 10 |

Table 4 tells us that the piezoelectric elements made from the Fourth Preferred Embodiments of the present bismuth layer compound in which Sr, i.e., the alkaline earth metal, substituted for a part of Pb exhibited the temperature variation rates of the sensitivities which were substantially identical with those exhibited by the Third Preferred Embodiments and set forth in Table 3 above. Although the graphs of the relationships between the temperatures and the relative sensitivities exhibited by the piezoelectric elements made from the Fourth Preferred Embodiments are not incorporated herein, they showed tendencies similar to those exhibited by the corresponding Third Preferred Embodiments and illustrated in FIGS. 5 through 8.

As having been described so far, the Third and Fourth Preferred Embodiments of the present bismuth layer compound exhibited the sensitivities which depended less on the temperature variations. Therefore, they can obviate the temperature compensation circuit even when they are applied to places where the temperatures vary violently, and accordingly they can be adapted to make a pressure sensor which should operate in a wider temperature range. Thus, they can be employed to reduce the overall manufacturing cost.

Further, the Third and Fourth Preferred Embodiments exhibited low relative dielectric constants of from 140 to 170. Hence, they are suitable to make a high-frequency filter, or the like.

Furthermore, some of the Third and Fourth Preferred Embodiments whose value "x" fell in the predetermined range, e.g., $0.2 \leq x \leq 0.3$, exhibited the relative sensitivities which scarcely fluctuated with respect to the temperature variations in the temperature range of from 70° to 130° C. and which kept the maximum relative sensitivities therein. Hence, they can be utilized to make pressure sensors, filters, or the like, which exhibit especially high relative sensitivities in the temperature ranges.

Fifth Preferred Embodiments (1) Production of Bismuth Layer Compound

The Fifth Preferred Embodiments of the present bismuth layer compound were prepared as described in the Third Preferred Embodiments except that magnesium oxide (MnO) was prepared as an extra starting raw material powder in addition to the four starting raw material powders, and that MnO was weighed so as to be contained in the resulting mixed powder in an amount of 0.05% by weight.

The mixed powder according to the Fifth Preferred Embodiments was processed into the pellet-shaped elements in the same manner as those of the Third Preferred Embodiments. The pellet-shaped elements included the Fifth Preferred Embodiments of the present bismuth layer compound which had a composition expressed by the chemical formula, $(Pb_{0.8}Na_{0.1}Bi_{4.1})Ti_4O_{15}+0.05$ MnO, i.e., a homologue of $\{(M3_{1-y}Pb_y)_{1-2x}M2_xBi_{4+x}\}Ti_4O_{15}+zMnO$ where "M2" is Na, the value "x" equals 0.1 and the value "y" equals 1 and which included Mn in a form of MnO in an amount of 0.05% by weight (i.e., z=0.05).

(2) Production of Piezoelectric Element

The resulting elements were processed into the piezoelectric elements as described in the Third Preferred Embodiments.

(3) Examination for Sensitivity

The piezoelectric elements according to the Fifth Preferred Embodiments were examined for their sensitivities in the piezoelectric property in the same manner as those of the First Preferred Embodiments. It was found that the results of the evaluation were equivalent to FIG. 5.

Likewise, the relative sensitivities were plotted, and the temperature variation rates of the sensitivity were calculated as described in the Third Preferred Embodiments. The result of the temperature variation rate calculation is set forth in Table 5 below.

(4) Examination for Dependency of Temperature Variation Rates of Sensitivity on Na Contents In addition, the above-mentioned five raw material powders were weighed respectively so that the molar ratios of Pb, Na, Bi, Ti and O satisfied the general chemical formula, $(Pb_{1-2x}Na_xBi_{4+x})Ti_4O_{15}+zMnO$, and that the value "x's," i.e., the molar ratios of Na, were 0, 0.05, 0.2, 0.3, 0.4, 0.45 and 0.5, respectively, and that the value "z," i.e., the content of MnO, was fixed at the predetermined value of 0.05% by weight. The resulting 7 mixed powders were processed into 7 piezoelectric elements in the same manner as the above-described bismuth layer compound expressed by the chemical formula, $(Pb_{0.8}Na_{0.1}Bi_{4.1})Ti_4O_{15}+0.05$ MnO, was processed.

Likewise, the resulting 7 piezoelectric elements were examined for their sensitivities in the piezoelectric property in accordance with FIG. 1 while varying the temperature variously in a range of from 30° to 150° C. Among the 7 piezoelectric elements, the 3 piezoelectric elements whose value "x's" fell in a range, $0.2 \leq x \leq 0.4$, were examined for the relative values of the sensitivities at the temperatures. The relative values of the sensitivities were calculated with respect to the sensitivity at 30° C. taken as 1. The results of the evaluation were found to be identical with those illustrated in FIGS. 6, 7 and 8, respectively.

Moreover, the other 4 piezoelectric elements whose value "x's" did not fall in the range, $0.2 \leq x \leq 0.4$, were also examined for the relative values of the sensitivities at the temperatures, and the relative values were plotted to draw graphs (not shown) similarly. In accordance with the graphs, the temperature variation rates exhibited by the other 4 piezoelectric elements were calculated. The results of the temperature variation rate calculations are also set forth in Table 5 below.

TABLE 5

| "x," Molar Ratio of Na | 0 | 0.05 | 0.1 | 0.2 | 0.3 | 0.4 | 0.45 | 0.5 |
|---|---|---|---|---|---|---|---|---|
| Temperature Variation Rate of Sensitivity (%) | 8 | 8 | 3 | 3 | 4 | 5 | 9 | 10 |

Evaluation No. 4

It is apparent from Table 5 that the piezoelectric elements were adapted to exhibit the temperature variation rate of the sensitivity of 5% or less when the value "x" fell in a range, $0.05 < x < 0.45$, and that the piezoelectric elements made from the bismuth layer compounds having the value "x" falling in the range exhibited remarkably reduced temperature variation rates when compared to the piezoelectric elements made from the conventional bismuth layer compound whose value "x" was zero. Hence, it was thus verified that the Fifth Preferred Embodiments of the present bismuth layer compound can make a piezoelectric element whose sensitivity is less likely to fluctuate with respect to the temperature variations, and that they are useful to make a pressure sensor.

By comparing FIGS. 5 and 8, the following can be understood: As illustrated in FIG. 5, the piezoelectric element which was made from one of the Fifth Preferred Embodiments of the present bismuth layer compound with the value "x" fixed at 0.1 (i.e., $x=0.1$) exhibited the relative sensitivities which depended on the temperature variations negatively. On the other hand, as illustrated in FIG. 8, the piezoelectric element which was made from one of the Fifth Preferred Embodiments of the present bismuth layer compound with the value "x" fixed at 0.4 (i.e., $x=0.4$) exhibited the relative sensitivities which depended on the temperature variations positively. Therefore, it is possible to readily control the dependency of the sensitivity on the temperature variations in the present bismuth layer compound by adjusting the value "x" of the aforementioned general chemical formula.

It is appreciated from FIGS. 6 and 7 that the Fifth Preferred Embodiments of the present bismuth layer compound with the value "x" fixed at 0.2 (i.e., $x=0.2$) and 0.3 (i.e., $0=0.3$) exhibited the relative sensitivities which scarcely fluctuated with respect to the temperature variations in certain temperature ranges, e.g., from 70° to 110° C. in FIG. 6 and from 90° to 130° C. in FIG. 7, and that the maximum relative sensitivities existed in the temperature ranges where the relative sensitivities were independent of the temperature variations. Hence, it is possible to use the Fifth Preferred Embodiments to make elements which exhibit high relative sensitivities in the temperature ranges.

(5) Examination for Dependency of Temperature Variation Rates of Sensitivity on Mn Contents Further, matrices were designed so as to satisfy the general chemical formula, $(Pb_{1-2x}Na_xBi_{4+x})Ti_4O_{15}+zMnO$, in which the value "z's" were varied in a range of from 0 to 0.30% by weight and the value "x" was fixed at 0.1. Then, the above-mentioned five raw material powders were weighed respectively so as to satisfy the composition of the matrices, and the resulting mixed powders were processed into a plurality of piezoelectric elements in the same manner as the above-described bismuth layer compound expressed by the chemical formula, $(Pb_{0.8}Na_{0.1}Bi_{4.1})Ti_4O_{15}0.05MnO$.

Each of the piezoelectric elements was examined for the sensitivity (in pC/N) at 30° C. and the magnitude of the hysteresis at 150° C. in the same manner as those of the Second Preferred Embodiments were examined. The results of the examinations are illustrated in FIG. 9.

Figure 9:
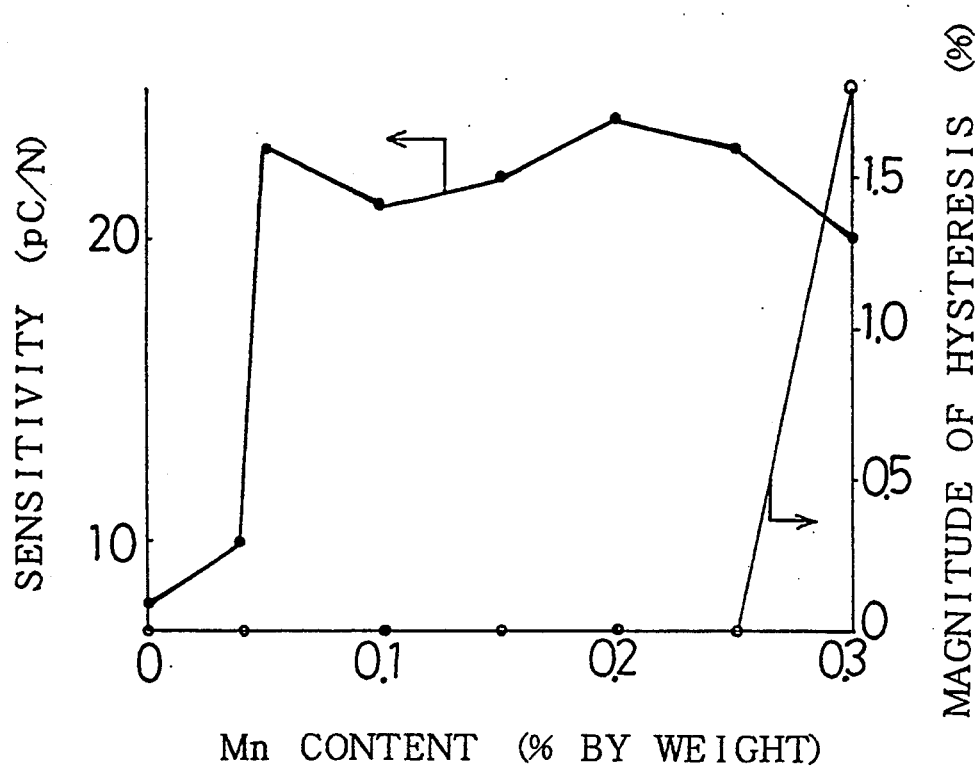
FIG. 9 is a diagram for illustrating a relationship between Mn content variations, sensitivities and magnitudes of hysteresis exhibited by the Fifth Preferred Embodiments of the present bismuth layer compound.

As can be appreciated from FIG. 9, the piezoelectric elements exhibited sharply deteriorating sensitivities when they included Mn in an amount of less than 0.05% by weight. On the other hand, they exhibited abruptly increasing magnitudes of the hysteresis when they included Mn in an amount of more than 0.25% by weight. Accordingly, it is understood that the piezoelectric elements can be adapted to simultaneously exhibit a high sensitivity and a hysteresis of low magnitude by controlling the Mn content in the range recited in the accompanying claim.

Furthermore, matrices were designed in the same manner except that the value "z" was fixed at 0.05% by weight and the value "x's," were varied in a range of from 0.1 to 0.4. Then, a plurality of piezoelectric elements satisfying the composition of the matrices were produced and examined for the sensitivity and the magnitude of the hysteresis as described above. Regardless of the variation in the value "x's," the piezoelectric elements exhibited behaviors in the sensitivity and the magnitude of the hysteresis similar to those illustrated in FIG. 9. Hence, it was found that the advantageous effects resulting from Mn are independent of those resulting from Na and Pb.

Sixth Preferred Embodiments

The following starting raw material powders were prepared: Strontium carbonate ($SrCO_3$), lead oxide (PbO), sodium carbonate ($Na_2CO_3$), bismuth oxide ($Bi_2O_3$), titanium oxide ($TiO_2$) and magnesium oxide (MnO). The first five raw material powders other than MnO were weighed respectively so that the molar ratios of Sr, Pb, Na, Bi and 0 satisfied the general chemical formula, $((Sr_{0.2} Pb_{0.8})_{1-2x}Na_xBi_{4+x})Ti_4O_{15}+zMnO$, that MnO was weighed so as to be contained in the resulting mixed powder in an amount of 0.05% by weight (i.e., $z=0.05$), and that the value "x's" were varied as described above, e.g., 0, 0.05, 0.1, 0.2, 0.3, 0.4, 0.45 and 0.5. Finally, they were wet-mixed in a pot mill together with water for 48 hours, respectively.

The resulting mixed powders were processed into piezoelectric elements in the same manner as described in the Third Preferred Embodiments, respectively. Likewise, the piezoelectric elements were examined for their relative sensitivities at the temperatures, thereby calculating the temperature variation rates of the sensitivities. The results of the temperature variation rate calculations are set forth in Table 6 below.

TABLE 6

| "x," Molar Ratio of Na | 0 | 0.05 | 0.1 | 0.2 | 0.3 | 0.4 | 0.45 | 0.5 |
|---|---|---|---|---|---|---|---|---|
| Temperature Variation Rate of Sensitivity (%) | 8 | 8 | 3 | 3 | 4 | 3 | 9 | 10 |

Table 6 tells us that the piezoelectric elements made from the Sixth Preferred Embodiments of the present bismuth layer compound in which Sr, i.e., the alkaline earth metal, substituted for a part of Pb exhibited the temperature variation rates of the sensitivities which were substantially identical with those exhibited by the Fifth Preferred Embodiments and set forth in Table 5 above. Although the graphs of the relationships between the temperatures and the relative sensitivities exhibited by the piezoelectric elements made from the Sixth Preferred Embodiments of the present bismuth layer compound whose value "x" fell in a range from 0.1 to 0.4 are not incorporated herein, they showed tendencies similar to those exhibited by the corresponding Fifth Preferred Embodiments and illustrated in FIGS. 5 through 8.

As having been described so far, the Fifth and Sixth Preferred Embodiments of the present bismuth layer compound exhibited the sensitivities which depended less on the temperature variations. Therefore, they can obviate the temperature compensation circuit even when they are applied to places where the temperatures vary violently, and accordingly they can be adapted to make a pressure sensor which should operate in a wider temperature range. Thus, they can be employed to reduce the overall manufacturing cost.

Further, the Fifth and Sixth Preferred Embodiments exhibited low relative dielectric constants of from 140 to 170. Hence, they are suitable to make a high-frequency filter, or the like.

Furthermore, some of the Fifth and Sixth Preferred Embodiments whose value "x" fell in the predetermined range, e.g., $0.2 \leq x \leq 0.3$, exhibited the relative sensitivities which scarcely fluctuated with respect to the temperature variations in the temperature range of from 70° to 130° C. and which kept the maximum relative sensitivities therein. Hence, they can be utilized to make pressure sensors, filters, or the like, which exhibit especially high relative sensitivities in the temperature ranges.

Moreover, the Fifth and Sixth Preferred Embodiments of the present bismuth layer compound exhibited high sensitivities. Therefore, they can detect micro pressure variations precisely. In particular, they hardly exhibited hysteresis when they were subjected to forces falling in a wide range of from 0 to 2,000N. Hence, they can be used as a pressure sensor for the places where large pressure variations arise. All in all, they can be employed to make a pressure sensor which can detect from the micro pressure variations to the large pressure variations accurately.

Having now fully described the present invention, it will be apparent to one of ordinary skill in the art that many changes and modifications can be made thereto without departing from the spirit or scope of the present invention as set forth herein including the appended claims.

What is claimed is:

1. A bismuth layer compound expressed by the chemical formula:

$(M1_{1-2x}M2_xBi_{4+x})Ti_4O_{15}$, wherein

"M1" is Sr or Sr and at least one other alkaline earth metal;

"M2" is an alkali metal: and

"x" falls in a range, $0.06 \leq x \leq 0.44$.

2. The bismuth layer compound according to claim 1, wherein said bismuth layer compound further includes Mn in the form of MnO in an amount of from 0.02 to 0.25% by weight.

3. The bismuth layer compound according to claim 2, wherein said bismuth layer compound includes MnO in an amount of from 0.05 to 0.10% by weight.

4. The bismuth compound according to claim 2, wherein said bismuth layer compound does not exhibit a hysteresis in an electric charge output-force diagram when it is subjected to a force falling in a range of from 0 to 2,000N.

5. The bismuth layer compound according to claim 1, wherein "x" falls in a range, $0.10 \leq x \leq 0.40$.

6. A bismuth layer compound expressed by the chemical formula:

$\{(M3_{1-y}Pb_y)_{1-2x}M2_xBi_{4+x}\}Ti_4O_{15}$, wherein

"M3" is an alkaline earth metal;

"M2" is an alkaline metal;

"x" falls in a range, $0.06 \leq x \leq 0.44$; and "y" falls in a range, $0 < y < 1.0$.

7. The bismuth layer compound according to claim 6, wherein said bismuth layer compound further includes Mn in the form of MnO in an amount of from 0.02 to 0.25% by weight.

8. The bismuth layer compound according to claim 7, wherein said bismuth layer compound includes Mn in the form of to MnO in an amount of from 0.05 to 0.10% by weight.

9. The bismuth layer compound according to claim 7, wherein said bismuth layer compound does not exhibit a hysteresis in an electric charge output-force diagram when it is subjected to a force falling in a range of from 0 to 2,000N.

10. The bismuth layer compound according to claim 6, wherein "x" falls in a range, $0.10 \leq x \leq 0.40$.

11. The bismuth layer compound according to claim 6 or 7, wherein "x" falls in a range of from 0.2 to 0.3, and said bismuth layer compound exhibits a sensitivity in its piezoelectric property which does not fluctuate with temperature variations in a temperature range of from 70° to 130° C. and whose maximum temperature variation rate of sensitivity is 5%.

12. A bismuth layer compound expressed by the chemical formula:

$(M1_{1-2x}M2_xBi_{4+x})Ti_4O_{15}$ wherein

"M1" is Sr or Sr and at least one other alkaline earth metal;

"M2" is an alkali metal: and

"x" falls in a range, $0.06 \leq x \leq 0.44$, wherein said bismuth layer compound further includes at least one element selected from the group consisting of Ni and Cr in an amount from 0.5 to 0.1% by weight, or MnO in an amount of from 0.02 to 0.25% by weight and said at least one element.

13. A bismuth layer compound expressed by the chemical formula:

$\{(M3_{1-y}Pb_y)_{1-2x}M2_xBi_{4+x}\}Ti_4O_{15}$, wherein

"M3" is an alkaline earth metal;

"M2" is an alkali metal;

"x" falls in a range, $0.06 \leq x \leq 0.44$; and

"y" falls in a range, $0 < y < 1.0$;

wherein said bismuth layer compound further includes at least one element selected from the group consisting of Ni and Cr in an amount of from 0.5 to 1.0% by weight, or MnO in an amount of from 0.05 to 0.25% weight and said at least one element.

* * * * *

UNITED STATES PATENT AND TRADEMARK OFFICE
CERTIFICATE OF CORRECTION

PATENT NO. : 5,369,068
DATED : November 29, 1994
INVENTOR(S) : Kaneko

It is certified that error appears in the above-indentified patent and that said Letters Patent is hereby corrected as shown below:

Abtract, Front Page, line 13, change "exhibits" to --exhibit--;

Beneath Claim 1, Col. 17, line 38, delete empty space.

Claim 6, Col. 18, line 7, change "alkaline" to --alkali--;

Claim 12, Col. 18, line 34, change "$O_{15}$ wherein" to --$O_{15}$, wherein--.

Signed and Sealed this

Twenty-eight Day of March, 1995

*Attest:*

BRUCE LEHMAN

*Attesting Officer*     *Commissioner of Patents and Trademarks*